US010485076B2

(12) United States Patent
Kim

(10) Patent No.: US 10,485,076 B2
(45) Date of Patent: Nov. 19, 2019

(54) METHOD AND APPARATUS FOR AUTOMATICALLY CONTROLLING ILLUMINATION BASED ON ILLUMINANCE CONTRIBUTION

(71) Applicant: ELECTRONICS AND TELECOMMUNICATIONS RESEARCH INSTITUTE, Daejeon (KR)

(72) Inventor: Dae Ho Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/188,849

(22) Filed: Nov. 13, 2018

(65) Prior Publication Data

US 2019/0313507 A1    Oct. 10, 2019

(30) Foreign Application Priority Data

Apr. 5, 2018    (KR) ........................ 10-2018-0039801

(51) Int. Cl.
*H05B 37/02*    (2006.01)

(52) U.S. Cl.
CPC ....... *H05B 37/0218* (2013.01); *H05B 37/029* (2013.01); *H05B 37/0254* (2013.01)

(58) Field of Classification Search
None
See application file for complete search history.

(56) References Cited

U.S. PATENT DOCUMENTS

| | | |
|---|---|---|
| 8,412,359 B2 | 4/2013 | Boleko Ribas |
| 9,179,522 B2 | 11/2015 | Delnoij |
| 9,474,136 B2 | 10/2016 | Kim et al. |
| 9,578,723 B2 | 2/2017 | Sung et al. |

(Continued)

FOREIGN PATENT DOCUMENTS

| | | |
|---|---|---|
| KR | 10-2005-0007965 A | 1/2005 |
| KR | 10-2012-0105366 A | 9/2012 |

(Continued)

OTHER PUBLICATIONS

David Caicedo et al., "Distributed Illumination Control with Local Sensing and Actuation in Networked Lighting Systems", IEEE Sensors Journal, vol. 13, No. 3, Mar. 2013.

*Primary Examiner* — Jany Richardson
(74) *Attorney, Agent, or Firm* — LRK Patent Law Firm

(57) ABSTRACT

An illumination control method includes calculating illuminances of a plurality of lighting apparatuses for at least one flat target surface on the basis of information regarding the lighting apparatuses stored in a database and flat target surface information received from a user, calculating an illuminance contribution of each of the lighting apparatuses for the at least one flat target surface on the basis of the illuminances of the plurality of lighting apparatuses for the at least one flat target surface, and calculating a luminance value of each of the lighting apparatuses on the basis of a target illuminance received from the user and the illuminance contribution of the lighting apparatus and controlling a luminance of each of the lighting apparatuses for luminance of the plurality of lighting apparatuses.

17 Claims, 8 Drawing Sheets

(56) References Cited

U.S. PATENT DOCUMENTS

| | | | |
|---|---|---|---|
| 2013/0234603 A1* | 9/2013 | Van Der Veen ... | H05B 37/0254 315/152 |
| 2015/0137686 A1* | 5/2015 | Aliakseyeu ........ | H05B 37/0227 315/153 |
| 2016/0014864 A1* | 1/2016 | Aliakseyeu ........ | H05B 37/0227 315/153 |
| 2016/0330820 A1* | 11/2016 | Doh ................... | H05B 37/0218 |
| 2017/0153012 A1 | 6/2017 | Boleko Ribas et al. | |

FOREIGN PATENT DOCUMENTS

| | | |
|---|---|---|
| KR | 10-1487321 B1 | 2/2015 |
| KR | 10-2015-0041208 A | 4/2015 |
| KR | 10-2015-0041227 A | 4/2015 |

\* cited by examiner

METHOD AND APPARATUS FOR AUTOMATICALLY CONTROLLING ILLUMINATION BASED ON ILLUMINANCE CONTRIBUTION

CROSS REFERENCE TO RELATED APPLICATION

This application claims priority to Korean Patent Application No. 10-2018-0039801, filed Apr. 5, 2018 in the Korean Intellectual Property Office (KIPO), the entire content of which is hereby incorporated by reference.

BACKGROUND

1. Technical Field

Example embodiments of the present invention relate to a method and an apparatus for automatically controlling illumination on the basis of illuminance contribution, and more specifically, to a method and an apparatus for controlling a luminance of a lighting on the basis of an illuminance contribution of the lighting for a flat target surface.

2. Description of Related Art

Conventional illumination control methods have been using a digital addressable lighting interface (DALI) illumination control network technology or a digital multiplex 512 (DMX512) illumination control network technology. By using the DALI illumination control network technology, a maximum of 64 lightings may be connected, and lighting numbers are automatically assigned to the individual lightings, but there is a problem in that a user has to turn the lightings on and off in order to match positions of the lightings and the lighting numbers. Accordingly, the DALI illumination control network technology has a problem in that the lightings have to be turned on or off or the lightings have to be installed for each lighting while lighting numbers are assigned to the lightings from the beginning.

By using the DMX512 illumination control network technology, a maximum of 512 lightings may be connected, and several thousands of lightings may be connected in a new illumination control network in which the lightings can be connected using an Internet Protocol (IP) network. However, since the user has to directly assign lighting numbers to the lightings using the DMX512 illumination control network technology, there is a problem in that it is difficult for a user to directly assign the lighting numbers to the large number of lightings.

In addition, an illuminance sensor is installed at a position of the user, and comparison between a measured illuminance and a user's demand is performed in order to control luminance of the lightings around the user according to the conventional illumination control methods. However, each of the methods has inconvenience of installing the illuminance sensor around the user, and there is also a problem of maintenance. In addition, in a case in which there are a plurality of lightings, since luminance control of one lighting may affect illuminances of the other positions, each of the conventional methods has a problem in that it is difficult to arbitrarily control luminance of the lightings for a specific position.

BRIEF DESCRIPTION OF DRAWINGS

Example embodiments of the present invention will become more apparent by describing example embodiments of the present invention in detail with reference to the accompanying drawings, in which.

DETAILED DESCRIPTION OF EXAMPLE EMBODIMENTS

An automatic illumination control apparatus according to an embodiment of the present invention may be formed into two types thereof such as an automatic illumination control apparatus for a centralized control method and an automatic illumination control apparatus for a distributed control method. The automatic illumination control apparatus for the centralized control method may be connected to a plurality of lightings through a wired or wireless communication and one automatic illumination control apparatus therefor may control the plurality of lightings. The automatic illumination control apparatus for the distributed control method may be connected to each of the lightings, and a plurality of automatic illumination control apparatuses identical to the automatic illumination control apparatus therefor may communicate with each other through wired or wireless communication to control the plurality of lightings.

An automatic illumination control apparatus for a centralized control method according to one embodiment of the present invention will be described in detail with reference to FIG. 1, and an automatic illumination control apparatus for a distributed control method according to another embodiment of the present invention will be described in detail with reference to FIG. 2. In one embodiment of the present invention, a lighting apparatus may be referred to as a lighting.

Figure 1:
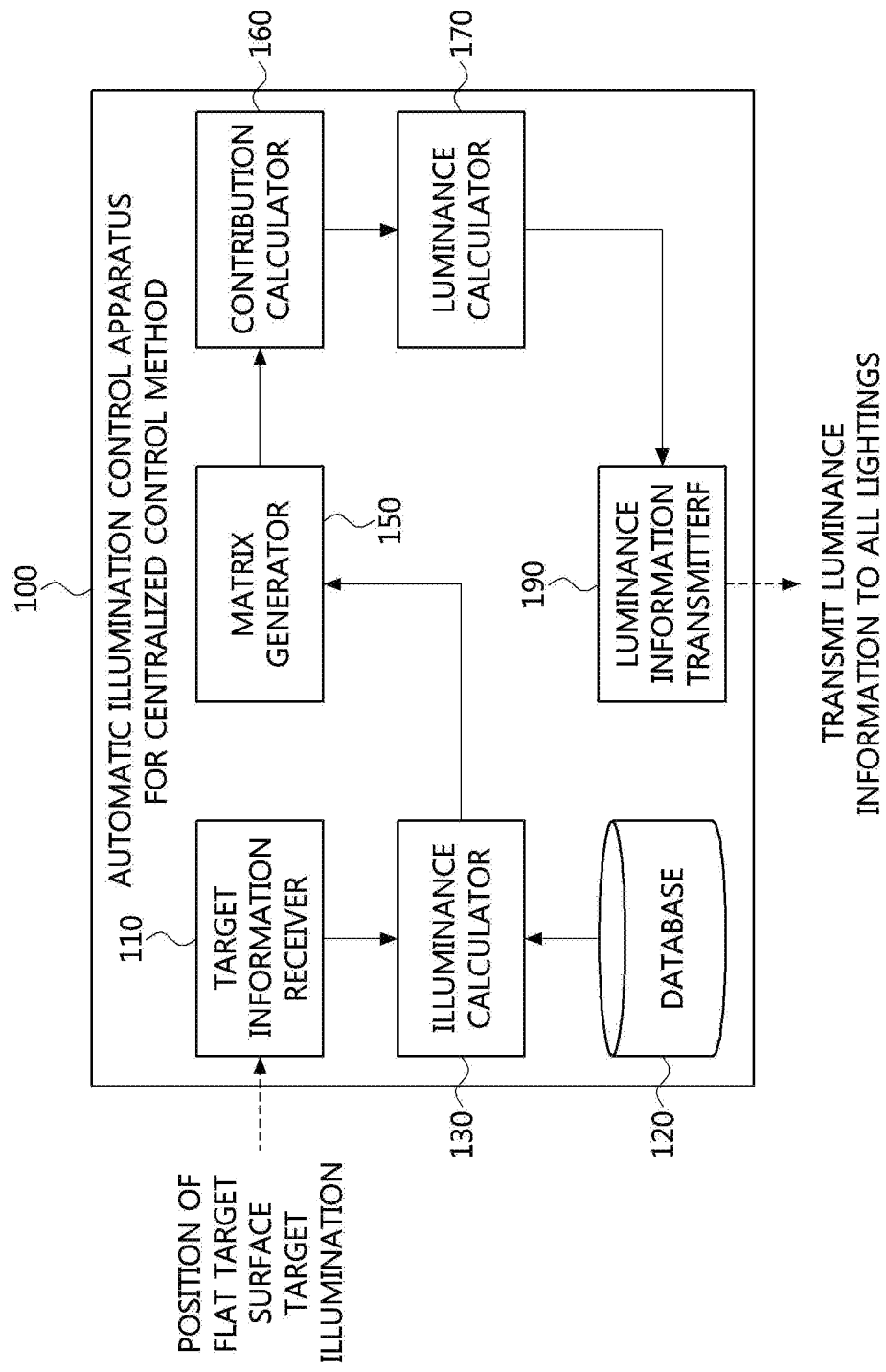
FIG. 1 is a block diagram of an automatic illumination control apparatus for a centralized control method according to one embodiment of the present invention.

FIG. 1 is a block diagram of an automatic illumination control apparatus for a centralized control method according to one embodiment of the present invention.

Referring to FIG. 1, an automatic illumination control apparatus 100 for a centralized control method according to one embodiment of the present invention may include a database 120, an illuminance calculator 130, a matrix generator 150, a contribution calculator 160, and a luminance calculator 170, and may further include at least one of a target information receiver 110 and a luminance information transmitter 190. Here, the components of the automatic illumination control apparatus 100 for a centralized control method are not restricted by the names thereof, and may be defined according to functions thereof. In addition, a plurality of functions may be performed by one component, and one function may also be performed by a plurality of components.

The target information receiver 110 may receive flat target surface information and a target illuminance from a user. Here, the flat target surface information may include position information regarding a flat target surface, and the position information may include distance information. Here, the distance information may be distances between the flat target surface and lightings, and may be directly calculated by the user. However, pre-calculated distance information may also be received as the distance information through wired or wireless communication.

The database 120 may store information regarding a lighting apparatus (lighting information), and the lighting information may include at least one among a luminous intensity [cd/lm], a total luminous flux [lm], a luminous efficiency [%], and a height [m] of the lighting. Here, the bracket may refer to a unit of data, but another unit may also be used to refer the data other than the unit in the bracket, and thus the unit is not limited thereto.

The illuminance calculator 130 may calculate illuminances of a plurality of lightings for at least one flat target surface on the basis of the flat target surface information received from the user through the target information receiver 110 and the lighting information stored in the database 120. A detailed operation of the illuminance calculator 130 will be described below with reference to FIG. 3.

The matrix generator 150 may generate a target-illuminance matrix on the basis of the illuminances of the plurality of lightings for at least one flat target surface calculated by the illuminance calculator 130. In other words, the target-illuminance matrix may be a matrix showing a relationship between an illuminance of the flat target surface and a luminance of a lighting.

The contribution calculator 160 may calculate illuminance contributions of the lightings on the basis of the target-illuminance matrix generated by the matrix generator 150. Here, the illuminance contributions may be calculated on the basis of illuminances of the flat target surface caused by the lightings with respect to power consumption of the lightings, and the illuminance contributions of the lightings for the flat target surface may be different.

The luminance calculator 170 may calculate luminance of the lightings for each lighting on the basis of the illumination contributions of the lightings calculated by the contribution calculator 160 and a target illuminance received from the user through the target information receiver 110. More specifically, while the luminance calculator 170 calculates luminance values of lightings in increasing order of the illuminance contribution to decrease luminance of the lightings, and calculate luminance values of the lightings in decreasing order of the illuminance contribution to increase luminance of the lightings, the luminance calculator 170 may calculate luminance values of the lightings for at least one flat target surface. A more detailed operation will be described with reference to a flowchart of FIG. 7.

The luminance information transmitter 190 may transmit the luminance values of the lightings calculated by the luminance calculator 170 to the lightings such that the illuminance of at least one flat target surface meets the target illuminance. Here, the luminance values of the lightings may be transmitted through wired or wireless communication, but a transmission method is not limited thereto.

The automatic illumination control apparatus 100 for a centralized control method according to one embodiment of the present invention may include at least one processor and a memory which stores at least one command for performing the above-described operation through the processor. Here, the processor may execute program commands stored in the memory, and may be a central processing unit (CPU), a graphics processing unit (GPU), or a specific processor configured to execute methods according to the present invention. The memory may include a volatile storage medium and/or non-volatile storage medium, or may include a read only memory (ROM) and/or a random access memory (RAM).

Figure 2:
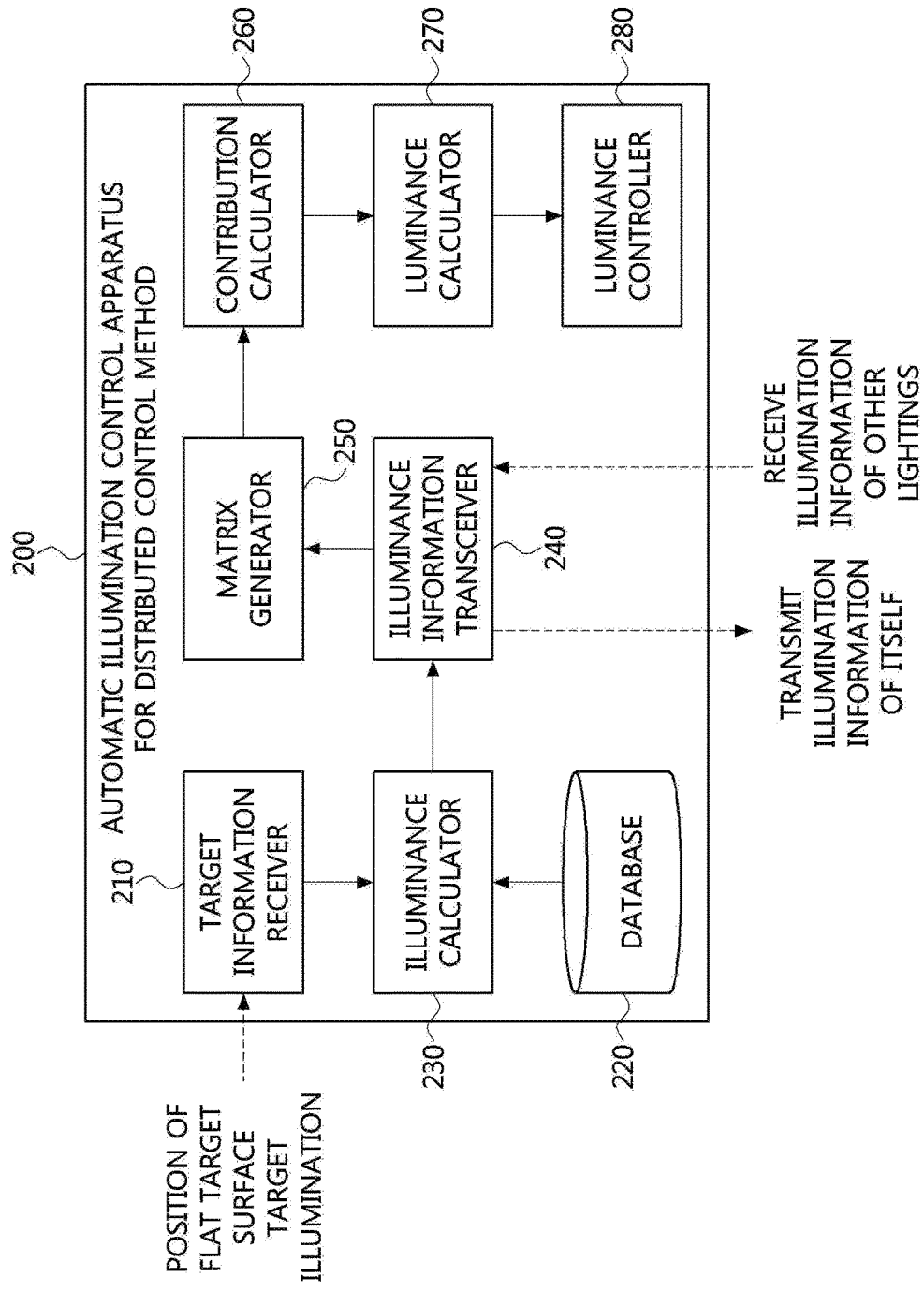
FIG. 2 is a block diagram of an automatic illumination control apparatus for a distributed control method according to another embodiment of the present invention.

FIG. 2 is a block diagram of an automatic illumination control apparatus for a distributed control method according to another embodiment of the present invention.

Referring to FIG. 2, an automatic illumination control apparatus 200 for a distributed control method according to one embodiment of the present invention may include a database 220, an illuminance calculator 230, an illuminance information transceiver 240, a matrix generator 250, a contribution calculator 260, a luminance calculator 270, and a luminance controller 280, and may further include at least one of a target information receiver 210 and at least one lighting. Here, the components of the automatic illumination control apparatus 200 for a distributed control method are not restricted by the names thereof, and may be defined according to functions thereof. In addition, a plurality of functions may be performed by one component, and one function may also be performed by a plurality of components.

The target information receiver 210, the database 220, and the illuminance calculator 230 may operate in the same manner as the target information receiver 110, the database 120, and the illuminance calculator 130 of the automatic illumination control apparatus 100 for a centralized control method described with reference to FIG. 1, but may operate and calculate only for at least one lighting included the automatic illumination control apparatus for a distributed control method.

The illuminance information transceiver 240 may transmit illuminance information regarding at least one lighting calculated by the illuminance calculator 230 to other automatic illumination control apparatuses for a distributed control method, and may receive illuminance information regarding the other lightings of the other automatic illumination control apparatuses for a distributed control method. In other words, the automatic illumination control apparatus 200 for a distributed control method may obtain the illuminance information regarding the other lightings through the illuminance information transceiver 240. Accordingly, contributions may be calculated using the illuminance information regarding all of the lightings.

The matrix generator 250 may generate a target-illuminance matrix on the basis of the illuminance information regarding other lightings for at least one flat target surface obtained through the illuminance information transceiver 240 and the illuminance information regarding at least one lighting calculated by the illuminance calculator 230.

The contribution calculator 260 and the luminance calculator 270 may operate in the same manner as the contribution calculator 160 and the luminance calculator 170 of the automatic illumination control apparatus 100 for a centralized control method described with reference to FIG. 1.

The luminance controller 280 may control a luminance of the lighting connected to or included in the luminance controller 280 on the basis of a luminance value of the lighting calculated by the luminance calculator 270.

The automatic illumination control apparatus 200 for a distributed control method according to one embodiment of the present invention may include at least one processor and a memory which stores at least one command for performing the above-described operation through the processor. Here, the processor may execute program commands stored in the memory, and may be a CPU, a GPU, or a specific processor configured to execute methods according to the present invention. The memory may include a volatile storage medium and/or non-volatile storage medium, or may include a ROM and/or a RAM.

Figure 3:
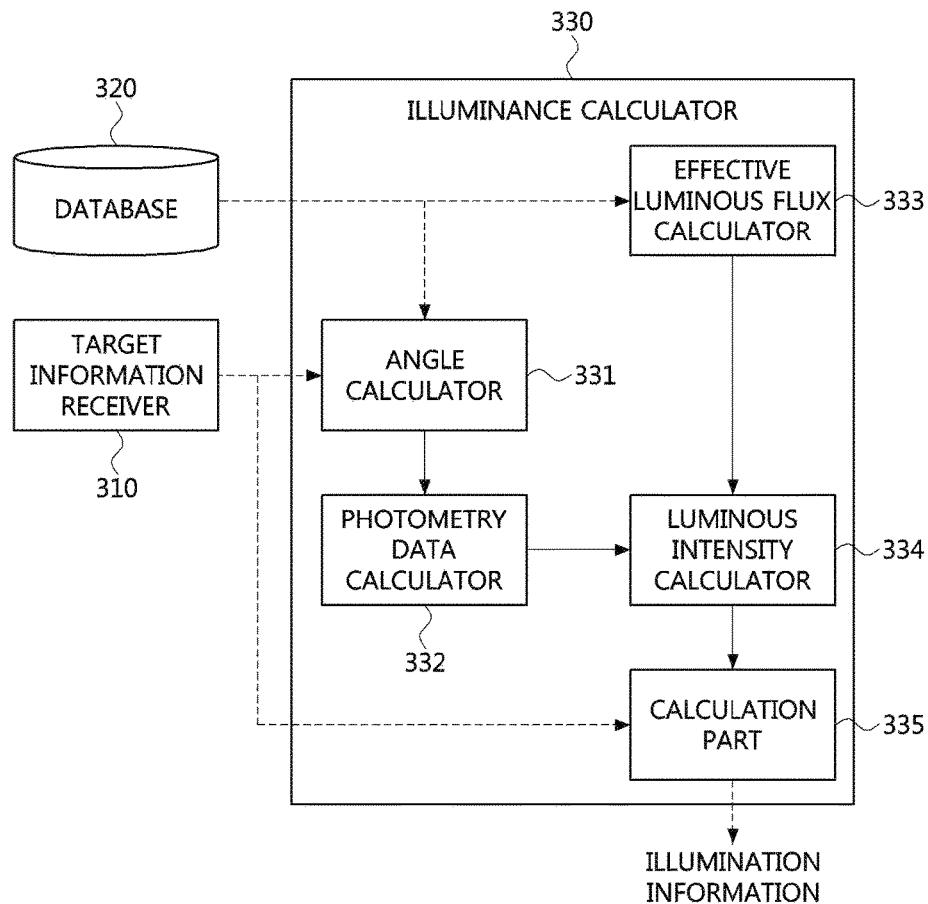
FIG. 3 is a block diagram of an illuminance calculator according to one embodiment of the present invention.

FIG. 3 is a block diagram of an illuminance calculator according to one embodiment of the present invention.

Referring to FIG. 3, an illuminance calculator 330 according to one embodiment of the present invention may include an angle calculator 331, a photometry data calculator 332, an effective luminous flux calculator 333, a luminous intensity calculator 334, and a calculation part 335. Here, the components of the illuminance calculator 330 are not restricted by the names thereof, and may be defined according to functions thereof. In addition, a plurality of functions may be performed by one component, and one function may be performed by a plurality of components.

In addition, the illuminance calculator 330 of FIG. 3 may be the illuminance calculator included in the automatic illumination control apparatus for a centralized control method, but the illuminance calculator included in the automatic illumination control apparatus for a distributed control method may also operate for at least one lighting in the same manner as the illuminance calculator included in the automatic illumination control apparatus for a centralized control method.

The angle calculator 331 may calculate angles of lightings toward at least one flat target surface with respect to the vertical line on the basis of position information regarding a flat target surface received from a user through a target information receiver 310 and heights of lightings stored in a database 320. Here, a method of calculating the angles with respect to the vertical line will be described with respect to FIG. 4.

The photometry data calculator 332 may calculate photometry values $P_\theta$ of the lightings on the basis of the angles θ of the lightings with respect to the vertical line calculated by the angle calculator 331, and the effective luminous flux calculator 333 may calculate effective luminous fluxes of the lightings on the basis of lighting information stored in the database 320. In other words, the effective luminous flux calculator 333 may calculate an effective luminous fluxes $F_e$ of the lightings through Equation 1 on the basis of a luminous efficiency e and a total luminous flux $F_T$ included in the lighting information. Here, the effective luminous flux may have a unit of lm.

$$F_e = e \times F_T (\text{lm}) \quad [\text{Equation 1}]$$

The luminous intensity calculator 334 may calculate luminous intensities $L_n$ of the lightings through Equation 2 on the basis of the photometry values $P_\theta$ calculated by the photometry data calculator 332 and the effective luminous fluxes $F_e$ calculated by the effective luminous flux calculator 333. Here, the luminous intensity may have a unit of cd.

$$L_n = P_\theta \times F_e (\text{cd}) \quad [\text{Equation 2}]$$

The calculation part 335 may calculate illuminances $I_n$ of the lightings for at least one flat target surface through Equation 3 on the basis of the luminous intensities $L_n$ of the lightings calculated by the luminous intensity calculator 334 and distance information received from the user through the target information receiver 310. Here, the illuminance may have a unit of lux.

$$I_n = \frac{L_n}{d_n^2} (lux) \quad [\text{Equation 3}]$$

The illuminance calculator 330 may provide information regarding the illuminances calculated by the calculation part 335 in order to generate a target-illuminance matrix.

Figure 4:
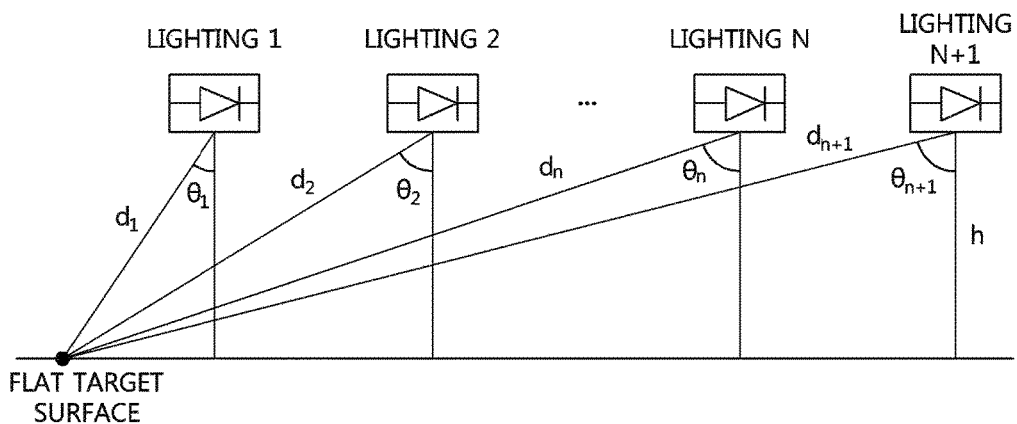
FIG. 4 is a view for describing a method of calculating angles of lightings toward a flat target surface with respect to the vertical direction according to one embodiment of the present invention.

FIG. 4 is a view for describing a method of calculating angles of lightings toward a flat target surface with respect to the vertical direction according to one embodiment of the present invention.

In order to describe a method of calculating angles with respect to the vertical line, it is assumed that n+1 lightings and one flat target surface exist. Here, n may be a positive integer greater than or equal to one.

Referring to FIG. 4, distance information including a distance $d_1$ from a flat target surface to a first lighting, a distance $d_2$ from the flat target surface to a second lighting, and a distance $d_{n+1}$ from flat target surface to a $(n+1)^{th}$ lighting may be obtained from a user through the target information receiver. In addition, heights h of the lightings may be stored in the database.

The angle calculator 331 may calculate the angles of the lightings toward the flat target surface with respect to the vertical line using arc cosine ($\cos^{-1}$) on the basis of the distances from the flat target surface to the lightings and the heights of the lightings, as shown in Equation 4.

$$\theta_n = \cos^{-1} \frac{h}{d_n} \quad [\text{Equation 4}]$$

In Equation 4, $\theta_n$ may be an angle of an n lighting toward a flat target surface with respect to the vertical line, h may be a height of the lighting, and $d_n$ may be a distance from the flat target surface to the $n^{th}$ lighting.

In other words, the angle calculator 331 may calculate the angle of the lighting toward the flat target surface with respect to the vertical line.

Figure 5:
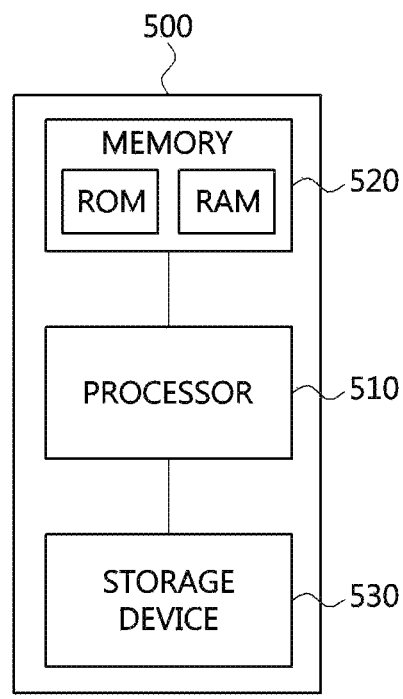
FIG. 5 is a block diagram of the automatic illumination control apparatus according to one embodiment of the present invention.

FIG. 5 is a block diagram of the automatic illumination control apparatus according to one embodiment of the present invention.

Referring to FIG. 5, an automatic illumination control apparatus 500 according to one embodiment of the present invention may include at least one processor 510, a memory 520, and a storage device 530.

Here, the automatic illumination control apparatus 500 may be the automatic illumination control apparatus for a centralized control method, but the automatic illumination control apparatus for a distributed control method may have a similar configuration and may operate similarly with the automatic illumination control apparatus 500.

The processor 510 may execute program commands stored in the memory 520 and/or the storage device 530. The processor 510 may be a CPU, a GPU, or a specific processor configured to execute methods according to the present invention. The memory 520 and the storage device 530 may include volatile storage media and/or non-volatile storage media, for example, the memory 520 may include a ROM and/or a RAM.

The memory 520 may store at least one command executed by the processor 510. At least one command may include a command for calculating illuminances of a plurality of lighting apparatuses for at least one flat target surface on the basis of information regarding the lighting apparatuses and flat target surface information received from a user stored in a database, a command for calculating illuminance contributions of the lighting apparatuses for at least one flat target surface on the basis of the illuminances of the plurality of lighting apparatuses for at least one flat target surface, and a command for calculating luminance of the lighting apparatuses on the basis of a target illuminance received from the user and the illuminance contributions of the lighting apparatuses and controlling the luminance of the plurality of lighting apparatuses for each lighting apparatus.

More specifically, the processor 510 may calculate illuminances of a plurality of lighting apparatuses for at least one flat target surface on the basis of information regarding the lighting apparatuses stored in the memory 520 and flat target surface information received from a user stored in the database. Here, the processor 510 may calculate angles of the plurality of lighting apparatuses toward at least one flat target surface with respect to the vertical line on the basis of the information regarding the lighting apparatuses and the flat target surface information, may calculate luminous intensities of the plurality of lighting apparatuses on the basis of the information regarding the lighting apparatuses and the angles with respect to the vertical line, and may calculate illuminances of the plurality of lighting apparatuses on the basis of the flat target surface information and the luminous intensities. In addition, the processor 510 may calculate effective luminous fluxes of the plurality of lighting apparatuses on the basis of the information regarding the lighting apparatuses in order to calculate the luminous intensities of the plurality of lighting apparatuses, may calculate photometry values of the plurality of lighting apparatuses on the basis of the information regarding the lighting apparatuses and the angles with respect to the vertical line, and may calculate the luminous intensities of the plurality of lighting apparatuses on the basis of the effective luminous fluxes and the photometry values.

The processor 510 may calculate illuminance contributions of the lighting apparatuses for at least one flat target surface on the basis of the illuminances of the plurality of lighting apparatuses for at least one flat target surface according to the command stored in the memory 520. Here, the processor 510 may generate a target-illuminance matrix for at least one flat target surface and the plurality of lighting apparatuses on the basis of the illuminances of the plurality of lighting apparatuses for at least one flat target surface, and may calculate the illuminance contributions of the lighting apparatuses using the target-illuminance matrix.

The processor 510 may calculate luminance values of the lighting apparatuses on the basis of a target illuminance received from a user and the illuminance contributions of the lighting apparatuses, and may control luminance of the plurality of lighting apparatuses for each lighting apparatus according to the command stored in the memory 520. Here, the processor 510 may set all luminance of the plurality of lighting apparatuses to maximum values, and may calculate first luminance values in which the luminance of the plurality of lighting apparatuses are decreased for each lighting apparatus on the basis of the target illuminance, the luminance of the plurality of lighting apparatuses, and the illuminance contributions of the lighting apparatuses. In addition, the processor 510 may calculate second luminance values in which the luminance of the plurality of lighting apparatuses are increased for each lighting apparatus on the basis of the target illuminance, the luminance of the plurality of lighting apparatuses, and the illuminance contributions of the lighting apparatuses, and may calculate a third luminance value in which the luminance of at least one lighting apparatus among the plurality of lighting apparatuses is increased for each lighting apparatus on the basis of the target illuminance, the luminance of the plurality of lighting apparatuses, and the illuminance contributions of the lighting apparatuses.

Here, the processor 510 may perform a first step of calculating an illuminance of at least one flat target surface according to luminance of the plurality of lighting apparatuses in order to calculate the first luminance values, may perform a second step of selecting the lighting apparatus, of which a sum of illuminance contributions for at least one flat target surface is the lowest, among the plurality of lighting apparatuses, and may perform a third step of selecting a flat target surface, at which the illuminance contribution of the selected lighting apparatus is the highest, among at least one flat target surface. In addition, the processor 510 may perform a fourth step of calculating the first luminance value of the selected lighting apparatus on the basis of an illuminance of the selected flat target surface and a target illuminance, and may perform a fifth step of repeatedly performing the first step to the fourth step until the first luminance values of the plurality of lighting apparatuses are calculated.

Here, the processor 510 may perform a sixth step of calculating an illuminance of at least one flat target surface according to the luminance of the plurality of lighting apparatuses in order to calculate the second luminance values, may perform a seventh step of selecting the lighting apparatus, of which a sum of illuminance contributions for at least one flat target surface is the highest, among the plurality of lighting apparatuses, and may perform an eighth step of selecting a flat target surface, at which the illuminance contribution of the selected lighting apparatus is the highest, among at least one flat target surface. In addition, the processor 510 may perform a ninth step of calculating the second luminance value of the selected lighting apparatus on the basis of an illuminance and the target illuminance of the selected flat target surface, and may perform a tenth step of repeatedly performing the sixth step to the ninth step until the second luminance values of all of the plurality of lighting apparatuses are calculated.

Here, the processor 510 may perform an eleventh step of calculating an illuminance of at least one flat target surface according to the illuminances of the plurality of lighting apparatuses in order to calculate the third luminance values, may perform a twelfth step of selecting a flat target surface, of which an illuminance is less than the target illuminance and a difference between the illuminance and the target illuminance is the largest, among at least one flat target surface, and may perform a thirteenth step of selecting the lighting apparatus, of which an illuminance contribution for the selected flat target surface is the highest, among the plurality of lighting apparatuses. In addition, the processor 510 may perform a fourteenth step of calculating the third luminance value of the selected lighting apparatus on the basis of the illuminance of the selected flat target surface and the target illuminance, and may perform a fifteenth step of repeatedly performing the eleventh step to the fourteenth step until there is no flat target surface, of which an illuminance is less than the target illuminance, among at least one flat target surface.

Figure 6:
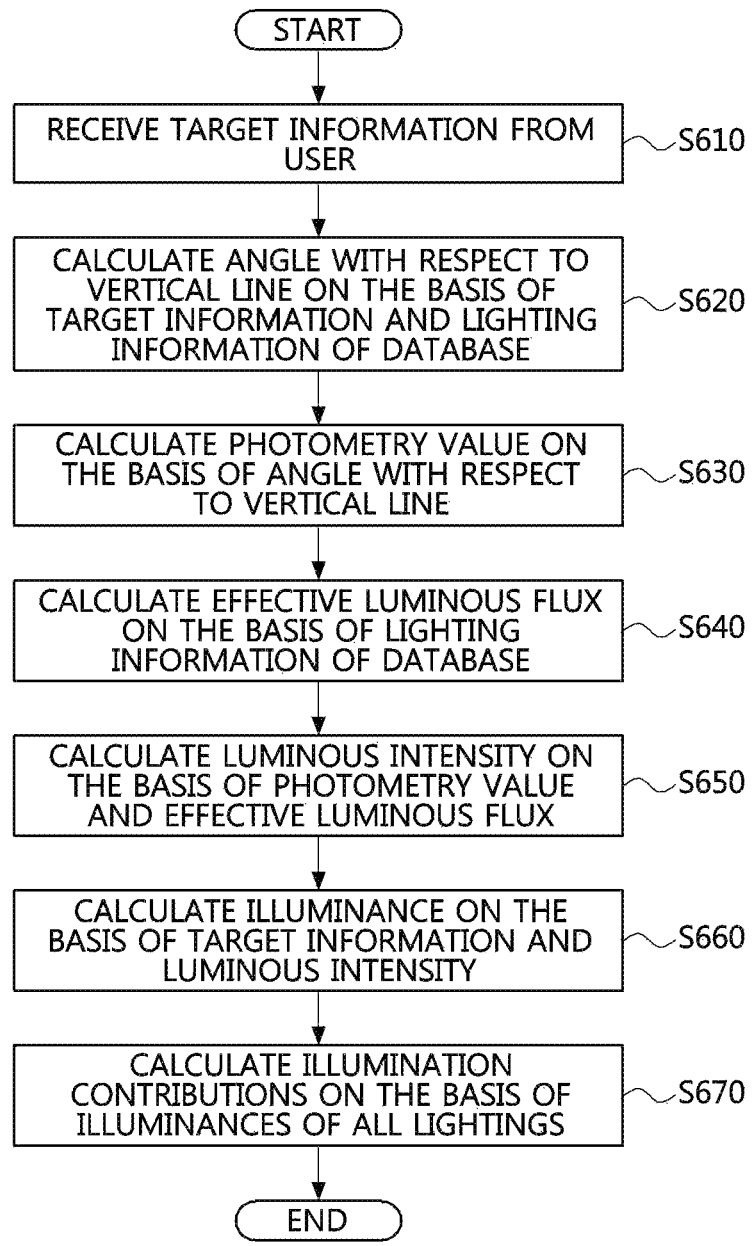
FIG. 6 is a flowchart for describing a method of calculating an illuminance contribution of the automatic illumination control apparatus according to one embodiment of the present invention.

FIG. 6 is a flowchart for describing a method of calculating an illuminance contribution of the automatic illumination control apparatus according to one embodiment of the present invention.

Referring to FIG. 6, first, the automatic illumination control apparatus according to one embodiment of the present invention may receive target information from a user (S610). The target information may include target illuminance and flat target surface information, and the flat target surface information may include at least one of position information $T_n$ and distance information $d_{nm}$ of a flat target surface. Here, n and m may be positive integers greater than or equal to one, $T_n$ may be an $n^{th}$ flat target surface, and $d_{nm}$ may be a distance from the $n^{th}$ flat target surface $T_n$ to an $m^{th}$ lighting.

The automatic illumination control apparatus may calculate an angle $\theta_{nm}$ of a lighting toward a flat target surface with respect to the vertical line on the basis of the received target information and lighting information stored in the database (S620). Here, the lighting information may include at least one of a luminous intensity [cd/lm], a total luminous flux [lm], a luminous efficiency [%], and a height [m] of a lighting. $\theta_{nm}$ may be an angle of the $m^{th}$ lighting toward an $n^{th}$ flat target surface $T_n$ with respect to the vertical line.

The automatic illumination control apparatus may calculate a photometry value $P_\theta$ on the basis of the angle $\theta_{nm}$ of the lighting toward the flat target surface with respect to the vertical line (S630), may calculate an effective luminous flux $F_e$ on the basis of the lighting information stored in the database (S640), and may calculate a luminous intensity $L_m$ of the lighting on the basis of the photometry value $P_\theta$ and the effective luminous flux $F_e$ (S650). Here, $L_m$ may be a luminous intensity of the $m^{th}$ lighting.

The automatic illumination control apparatus may calculate an illuminance $I_{nm}$ of the lighting for the flat target surface on the basis of the received target information and the calculated luminous intensity (S660), and may calculate illumination contributions $C_m$ of lightings on the basis of illuminances of the lightings (S670). Here, the illuminance contribution may be calculated on the basis of the illuminance of the flat target surface with respect to a power consumption of the lighting. In other words, the illuminance contribution may be calculated through Equation 5.

$$C_m = \frac{I_{nm}}{W_m} \quad \text{[Equation 5]}$$

In Equation 5, $C_m$ may be an illumination contribution of the $m^{th}$ lighting, $I_{nm}$ may be an illuminance of the $m^{th}$ lighting for the $n^{th}$ flat target surface, and $W_m$ may be a power consumption of the $m^{th}$ lighting.

All of the above-described steps may be performed for each of the lightings in order to obtain illuminance information regarding all of the lightings, or all of the above-described steps may also be simultaneously performed for the lightings.

In addition, although not illustrated in FIG. 6, the automatic illumination control apparatus may generate a target-illuminance matrix on the basis of the illuminances of the lightings, and may also calculate illuminance contributions on the basis of the target-illuminance matrix.

The description of the above-described automatic illumination control apparatus may be a description of the automatic illumination control apparatus for a centralized control method, and in the case of the automatic illumination control apparatus for a distributed control method, illuminance information regarding lightings may be transmitted or received between different automatic illumination control apparatuses, and thus the automatic illumination control apparatus can obtain the illuminance information regarding all of the lightings.

A method of controlling lightings performed by the automatic illumination control apparatus using illuminance contributions will be specifically described with reference to FIG. 7.

Figure 7:
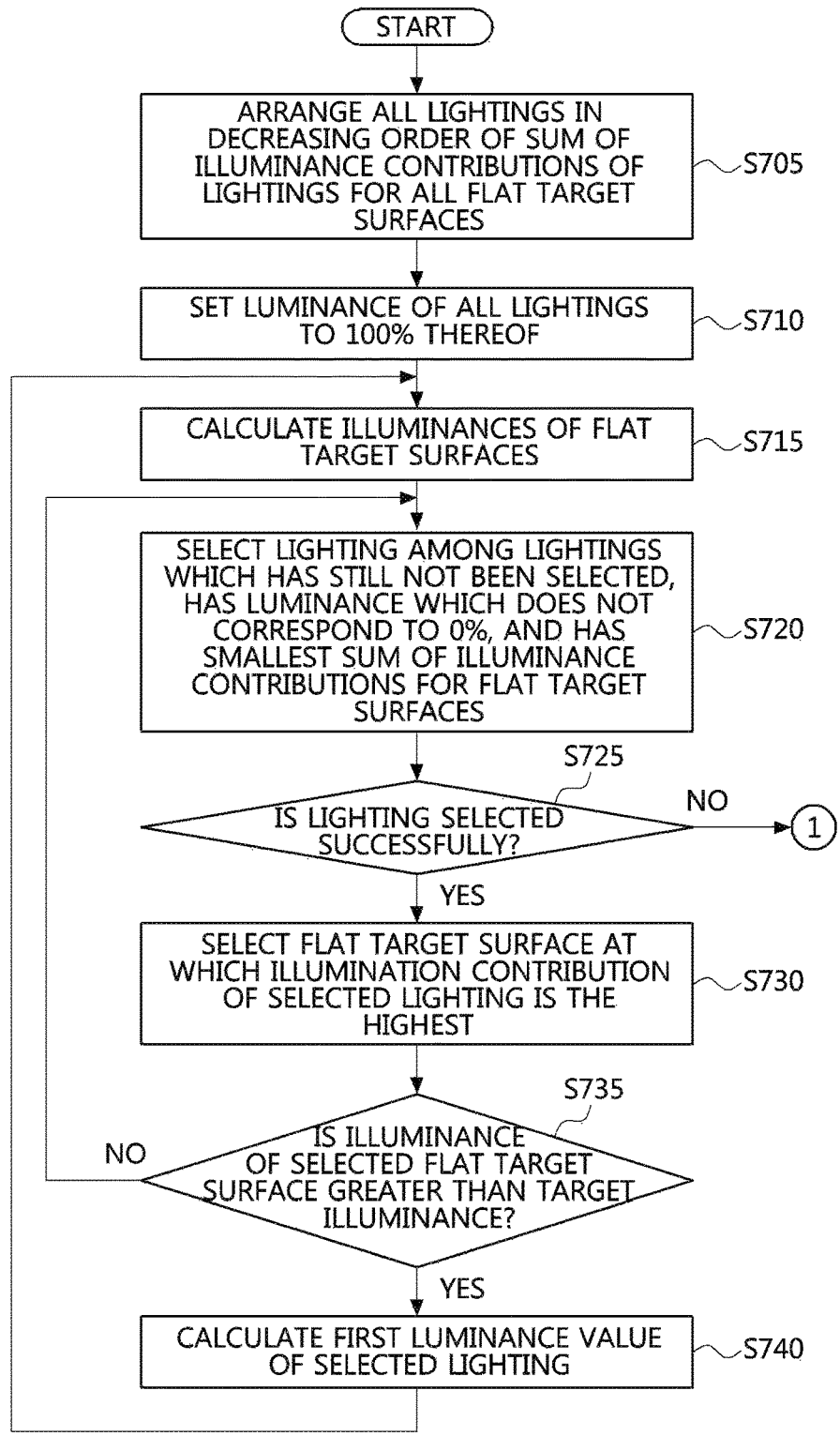
FIG. 7 is a flowchart for describing a first step of an illumination control method on the basis of illuminance contributions according to one embodiment of the present invention.

FIG. 7 is a flowchart for describing a first process of a method of controlling lightings on the basis of illuminance contribution according to one embodiment of the present invention.

Figure 8:
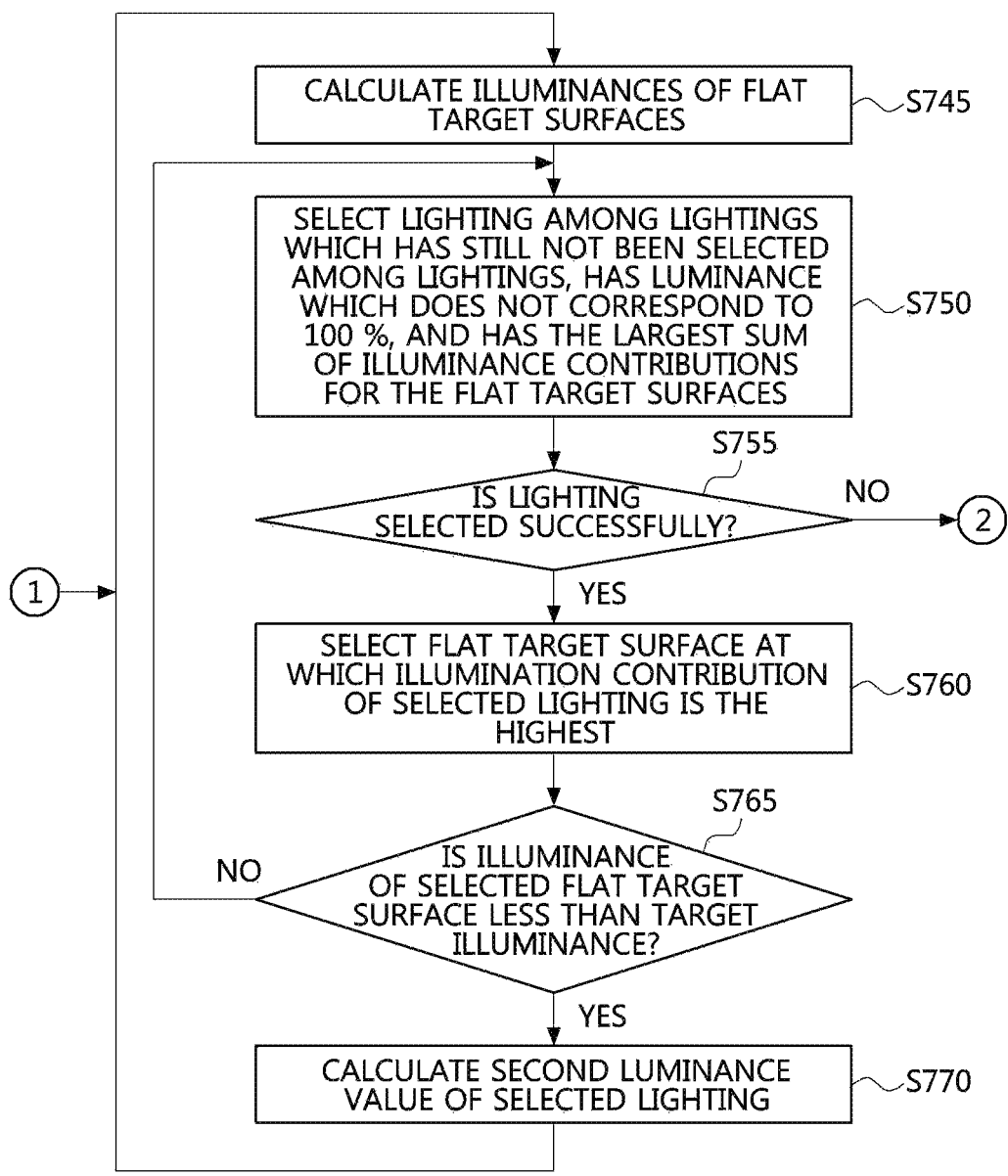
FIG. 8 is a flowchart for describing a second step of the method of controlling the illumination on the basis of the illuminance contributions according to one embodiment of the present invention.

FIG. 8 is a flowchart for describing a second process of the method of controlling the lightings on the basis of the illuminance contributions according to one embodiment of the present invention.

Figure 9:
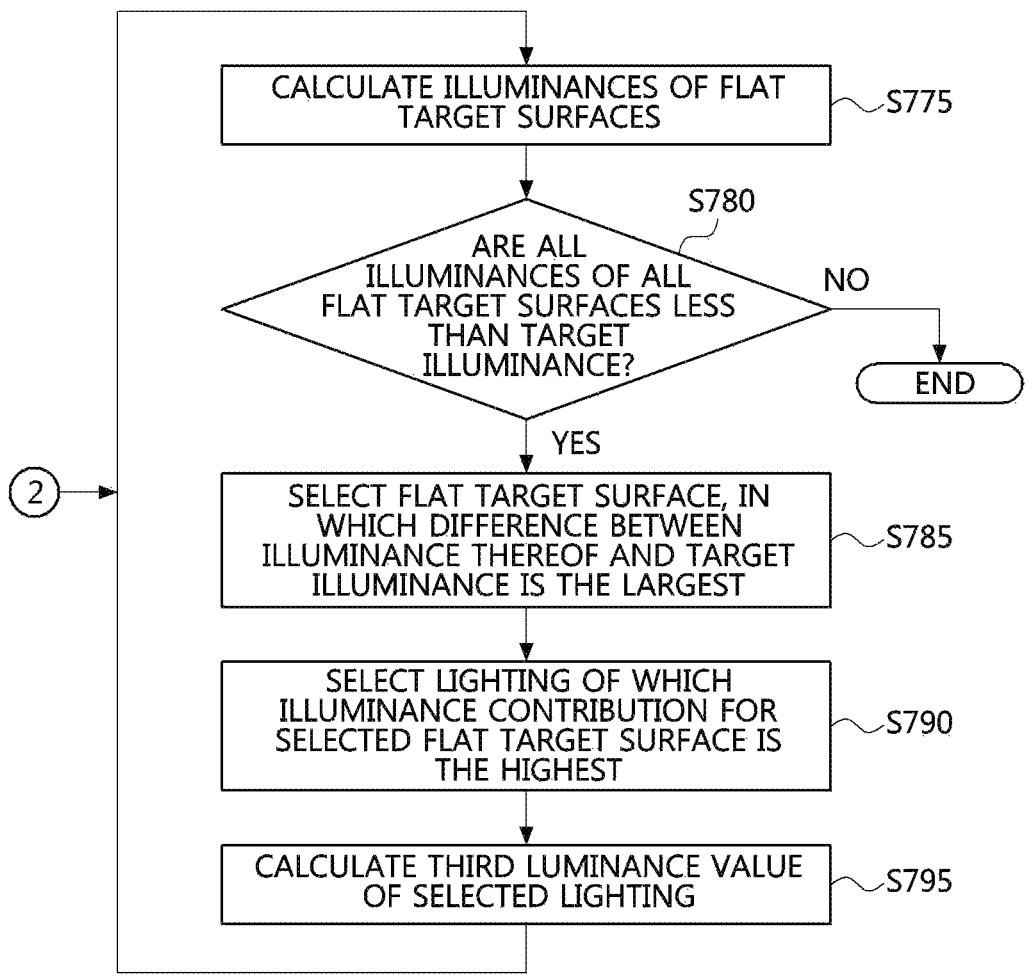
FIG. 9 is a flowchart for describing a third step of the method of controlling the illumination on the basis of the illuminance contribution according to one embodiment of the present invention.

FIG. 9 is a flowchart for describing a third process of the method of controlling the lightings on the basis of the illuminance contributions according to one embodiment of the present invention.

① of FIG. 7 is followed by ① of FIG. 8, and ② of FIG. 8 is followed by ② of FIG. 9.

Referring to FIGS. 7 to 9, the automatic illumination control apparatus may arrange all of the lightings in decreasing order of a sum of illuminance contributions of the lightings for all flat target surfaces (S705), the automatic illumination control apparatus may set luminance of all of the lightings to 100% thereof (S710). Here, 100% may be a maximum of a luminance of the lighting, $D_m$ may be a luminance of an $m^{th}$ lighting, and in a case in which a value of $D_m$ is in a range of zero to one, $D_m$ may be set to one.

Next, the automatic illumination control apparatus may perform a process of calculating first luminance of the lightings.

The automatic illumination control apparatus may calculate illuminances of the flat target surfaces on the basis of current luminance of the lightings (S715). Here, illuminances $E_n$ of the flat target surfaces $T_n$ may be calculated on the basis of illuminances of the lightings for the flat target surfaces and luminance of the lightings, and may be described as in Equation 6.

$$\begin{bmatrix} E_1 \\ \vdots \\ E_n \end{bmatrix} = \begin{bmatrix} I_{11} & \cdots & I_{1m} \\ \vdots & \ddots & \vdots \\ I_{n1} & \cdots & I_{nm} \end{bmatrix} * \begin{bmatrix} D_1 \\ \vdots \\ D_m \end{bmatrix} \quad \text{[Equation 6]}$$

In Equation 6, $E_1$ to $E_n$ may be illuminances of a first flat target surface to an $n^{th}$ flat target surface, $I_{11}$ to $I_{nm}$ may be a target-illuminance matrix which describes illuminances of a first lighting to an $m^{th}$ lighting for the first flat target surface to the $n^{th}$ flat target surface, and $D_1$ to $D_m$ may be luminance of the first lighting to the $m^{th}$ lighting.

The automatic illumination control apparatus may select one lighting among the lightings which has still not been selected, has a luminance which does not correspond to 0%, and has the smallest sum of illuminance contributions for the flat target surfaces (S720), and in a case in which there is a lighting which meets the above conditions and the lighting is selected successfully (S725), the automatic illumination control apparatus may select a flat target surface at which the illumination contribution of the selected lighting is the highest (S730).

The automatic illumination control apparatus may compare the illuminance of the selected flat target surface and a target illuminance (S735), and in a case in which the illuminance of the selected flat target surface is greater than the target illuminance, the automatic illumination control apparatus may calculate a first luminance value of the selected lighting through Equation 7 (S740).

$$D'_m = D_m + \frac{(E_T - E_n)}{I_{nm}} \times 100 \quad \text{[Equation 7]}$$

In Equation 7, $D_m'$ may be a newly calculated first luminance value of the ma lighting, and $D_m$ may be a previous illuminance value of the $m^{th}$ lighting. In addition, $E_T$ may be a target illuminance, $E_n$ may be an illuminance of the $n^{th}$ flat target surface, and $I_{nm}$ may be an illuminance of the $m^{th}$ lighting of the $n^{th}$ flat target surface.

In a case in which first luminance values are calculated, the automatic illumination control apparatus may calculate illuminances of the flat target surfaces on the basis of the calculated first luminance values (S715), and the above-described process may be repeatedly performed.

However, in a case in which the illuminance of the selected flat target surface is not greater than the target illuminance, the automatic illumination control apparatus may reselect one lighting among the lightings which has still not been selected in the process of calculating the first luminance, has the illuminance which does not correspond to 0%, and has the smallest sum of illuminance contributions for the flat target surfaces (S720), and the above-described process may be repeatedly performed.

In a case in which there is no lighting which is not selected or a lighting is not selected successfully, the automatic illumination control apparatus lightings may perform a process of calculating second luminance.

The automatic illumination control apparatus may calculate illuminance of the flat target surfaces on the basis of the current luminance of the lightings (S745), and here, the illuminance of the flat target surfaces may be calculated through the above-mentioned Equation 6.

The automatic illumination control apparatus may select one lighting among the lightings which has still not been selected among the lightings, has a luminance which does not correspond to 100%, and has the largest sum of illuminance contributions for the flat target surfaces (S750), and in a case in which there is a lighting which meets the corresponding conditions and the lighting is selected successfully (S755), the automatic illumination control apparatus may select a flat target surface at which the illumination contribution of the selected lighting is the highest (S760).

The automatic illumination control apparatus may compare the illuminance of the selected flat target surface and the target illuminance (S765), and in a case in which the illuminance of the selected flat target surface is less than the target illuminance, the automatic illumination control apparatus may calculate a second luminance value of the selected lighting through the above-mentioned Equation 7 (S770). Here, in a case in which Equation 7 is used, $D_m'$ may be a newly calculated second luminance of the mm lighting.

In a case in which second luminance values are calculated, the automatic illumination control apparatus may recalculate illuminances of the flat target surfaces (S745), and may repeatedly perform the above-described process.

However, in a case in which the illuminance of the selected flat target surface is not less than the target illuminance, the automatic illumination control apparatus may reselect one lighting among the lightings which has still not been selected in the process of calculating the second luminance, has the luminance which does not correspond to 100%, and has the largest sum of illuminance contributions for the flat target surfaces (S750), and may repeatedly perform the above-described process.

In a case in which there is no lighting which is not selected or a lighting is not selected successfully, the automatic illumination control apparatus may perform a process of calculating third luminance of the lightings.

Although the first luminance calculation process and the second luminance calculation process of the automatic illumination control apparatus may be applied to all of the lightings, but since the third luminance calculation process may have the meaning of adjustment, the third luminance calculation process may be applied to only some lightings.

The automatic illumination control apparatus may calculate illuminances of the flat target surfaces on the basis of the current luminance of the lightings (S775). Here, the illuminances of the flat target surfaces may be described as in the above-mentioned Equation 6.

The automatic illumination control apparatus may compare the illuminances of all of the flat target surfaces and the target illuminance (S780), and in a case in which the illuminance of at least one flat target surface is less than the target illuminance, the automatic illumination control apparatus may select a flat target surface, in which a difference between the illuminance thereof and the target illuminance is the largest, among at least one flat target surface (S785).

In addition, the automatic illumination control apparatus may select a lighting of which an illuminance contribution for the selected flat target surface is the highest (S790), and may calculate a third luminance value of the selected lighting through the above-mentioned Equation 7 (S795). Here, in a case in which the above-mentioned Equation 7 is used, $D_m'$ may be a newly calculated third illuminance of the $m^{th}$ lighting.

In a case in which third luminance values are calculated, the automatic illumination control apparatus may recalculate illuminances of the flat target surfaces using the third luminance values (S775), and may repeatedly perform the above-described process.

In a case in which all of the illuminances of the flat target surfaces are not less than the target illuminance, the automatic illumination control apparatus may stop operating, determine the final luminance values of the lightings, and control the luminance of the lightings on the basis of the final luminance values of the lightings.

According to the example embodiments of the present invention, information of positions at which lightings are actually disposed can be obtained in an illumination control network in which lighting numbers are automatically assigned to the lightings.

According to the example embodiments of the present invention, a maintenance cost can be reduced, and an illumination service for a user can be provided without installing a separate apparatus such as an illuminance sensor.

What is claimed is:
1. An illumination control method of an automatic illumination control apparatus including an illuminance calcu- lator, a contribution calculator, and a luminance calculator, the illumination control method comprising:

calculating, by the illuminance calculator, illuminances of a plurality of lighting apparatuses on at least one flat target surface on the basis of information regarding the lighting apparatuses stored in a database and flat target surface information received from a user;

calculating, by the contribution calculator, an illuminance contribution of each of the lighting apparatuses on the at least one flat target surface on the basis of the illuminances of the lighting apparatuses on the at least one flat target surface; and calculating, by the luminance calculator, a luminance value of each of the lighting apparatuses on the basis of a target illuminance received from the user and the illuminance contribution of each of the lighting apparatuses to thereby control a luminance of each of the lighting apparatuses for luminance of the lighting apparatuses.

2. The illumination control method of claim 1, wherein the calculating of the illuminances of the plurality of lighting apparatuses on the at least one flat target surface includes:

calculating an angle of each of the lighting apparatuses toward the at least one flat target surface with respect to a vertical line to the at least one flat target surface on the basis of the information regarding the lighting apparatuses and the flat target surface information;

calculating a luminous intensity of each of the lighting apparatuses on the basis of the information regarding the lighting apparatuses and the angles with respect to the vertical line; and calculating the illuminance of each of the lighting apparatuses on the basis of the flat target surface information and the luminous intensity.

3. The illumination control method of claim 2, wherein the calculating of the luminous intensity of each of the lighting apparatuses on the basis of the information regarding the lighting apparatuses and the angles with respect to the vertical line includes:

calculating an effective luminous flux of each of the lighting apparatuses on the basis of the information regarding the lighting apparatuses;

calculating a photometry value of each of the lighting apparatuses on the basis of the information regarding the lighting apparatuses and the angles with respect to the vertical line; and calculating the luminous intensity of each of the lighting apparatuses on the basis of the effective luminous flux and the photometry value.

4. The illumination control method of claim 1, wherein the calculating of the illuminance contribution of each of the lighting apparatuses on the at least one flat target surface on the basis of the illuminances of the lighting apparatuses on the at least one flat target surface includes:

generating a target-illuminance matrix for the at least one flat target surface and the lighting apparatuses on the basis of the illuminances of the lighting apparatuses on the at least one flat target surface; and calculating the illuminance contribution of each of the lighting apparatuses using the target-illuminance matrix.

5. The illumination control method of claim 1, wherein the calculating of the luminance value of each of the lighting apparatuses on the basis of the target illuminance received from the user and the illuminance contribution of each of the lighting apparatuses to control the luminance of each of the lighting apparatuses for the luminance of the lighting apparatuses includes:

setting all of the luminance of the lighting apparatuses to maximum values; and calculating a first luminance value in which the luminance of each of the lighting apparatuses is decreased for the luminance of the lighting apparatuses on the basis of the target illuminance, the luminance of the lighting apparatuses, and the illuminance contribution of each of the lighting apparatuses.

6. The illumination control method of claim 5, wherein the calculating of the first luminance value in which the luminance of each of the lighting apparatuses is decreased for the luminance of the lighting apparatuses includes:

a first step of calculating an illuminance of the at least one flat target surface according to the luminance of the lighting apparatuses;

a second step of selecting the lighting apparatus, of which a sum of the illuminance contributions for the at least one flat target surface is the lowest, among the lighting apparatuses;

a third step of selecting a flat target surface, at which the illuminance contribution of the selected lighting apparatus is the highest, among the at least one flat target surface;

a fourth step of calculating the first luminance value of the selected lighting apparatus on the basis of an illuminance of the selected flat target surface and the target illuminance; and a fifth step of repeatedly performing the first step to the fourth step until all of the first luminance values of the lighting apparatuses are calculated.

7. The illumination control method of claim 5, wherein the calculating of the luminance value of each of the lighting apparatuses on the basis of the target illuminance received from the user and the illuminance contribution of each of the lighting apparatuses to control the luminance of each of the lighting apparatuses for the luminance of the lighting apparatuses further includes:

calculating a second luminance value in which the luminance of each of the lighting apparatuses is increased for the luminance of the lighting apparatuses on the basis of the target illuminance, the luminance of the lighting apparatuses, and the illuminance contribution of each of the lighting apparatuses.

8. The illumination control method of claim 7, wherein the calculating of the second luminance value in which the luminance of each of the lighting apparatuses is increased for the luminance of the lighting apparatuses includes:

a sixth step of calculating a illuminance of h at least one flat target surface according to the luminance of the lighting apparatuses;

a seventh step of selecting the lighting apparatus, of which a sum of the illuminance contributions for the at least one flat target surface is the highest, among the lighting apparatuses;

an eighth step of selecting a flat target surface, at which the illuminance contribution of the selected lighting apparatus is the highest, among the at least one flat target surface;

a ninth step of calculating the second luminance value of the selected lighting apparatus on the basis of the illuminance of the selected flat target surface and the target illuminance; and a tenth step of repeatedly performing the sixth step to the ninth step until all of the second luminance values of the lighting apparatuses are calculated.

9. The illumination control method of claim 7, wherein the calculating of the luminance value of each of the lighting apparatuses on the basis of the target illuminance received from the user and the illuminance contribution of each of the lighting apparatuses to control the luminance of each of the lighting apparatuses for the luminance of the lighting apparatuses further includes;
calculating a third luminance value in which the luminance of at least one of the lighting apparatuses is increased for each of the lighting apparatuses on the basis of the target illuminance, the luminance of the lighting apparatuses, and the illuminance contribution of each of the lighting apparatuses.

10. The illumination control method of claim 9, wherein the calculating of the third luminance value in which the luminance of the at least one of the lighting apparatuses is increased for each of the lighting apparatuses includes:
an eleventh step of calculating an illuminance of the at least one flat target surface according to the luminance of the lighting apparatuses;
a twelfth step of selecting a flat target surface, in which an illuminance is lower than the target illuminance and a difference between the illuminance and the target illuminance is the highest, among the at least one flat target surface;
a thirteenth step of selecting the lighting apparatus, of which the illuminance contribution for the selected flat target surface is the highest, among the lighting apparatuses;
a fourteenth step of calculating the third luminance value of the selected lighting apparatus on the basis of the illuminance of the selected flat target surface and the target illuminance; and
a fifteenth step of repeatedly performing the eleventh step to the fourteenth step until there is no flat target surface, of which an illuminance is less than the target illuminance, among the at least one flat target surface.

11. An illumination control method of any one of automatic illumination control apparatuses each including a lighting apparatus, an illuminance calculator, an illumination information transceiver, a contribution calculator, a luminance calculator, and a luminance controller, the illumination control method comprising:
calculating, by the illuminance calculator, an illuminance of the lighting apparatus on at least one flat target surface on the basis of information regarding the lighting apparatus stored in a database and flat target surface information received from a user;
transmitting, by the illumination information transceiver, information regarding the calculated illuminance of the lighting apparatus to at least another one of the illumination control apparatuses, and receiving, by the illumination information transceiver, information regarding an illuminance of the at least other lighting apparatus from the at least other illumination control apparatus;
calculating, by the contribution calculator, an illuminance contribution of each of the lighting apparatuses on the at least one flat target surface on the basis of information regarding the illuminance of the lighting apparatus and the illuminance of the at least other lighting apparatus for on the at least one flat target surface; and
calculating, by the luminance calculator, a luminance value of the lighting apparatus on the basis of a target illuminance received from the user and the illuminance contribution of each of the lighting apparatuses, and controlling, by the luminance controller, a luminance of the lighting apparatus.

12. The illumination control method of claim 11, wherein the calculating of the illuminance of the lighting apparatus on the at least one flat target surface includes:
calculating an angle of the lighting apparatus toward the at least one flat target surface with respect to a vertical line to the at least one flat target surface on the basis of the information regarding the lighting apparatus and the flat target surface information;
calculating a luminous intensity of the lighting apparatus on the basis of the information regarding the lighting apparatus and the angle with respect to the vertical line; and
calculating the illuminance of the lighting apparatus on the basis of the flat target surface information and the luminous intensity.

13. The illumination control method of claim 11, wherein the calculating of the illuminance contribution of each of the lighting apparatuses on the at least one flat target surface includes:
generating a target-illuminance matrix for the at least one flat target surface, the lighting apparatus, and the at least other lighting apparatus on the basis of information regarding the illuminance of the lighting apparatus and the illuminance of the at least other lighting apparatus on the at least one flat target surface; and
calculating the illuminance contribution of each of the lighting apparatuses using the target-illuminance matrix.

14. The illumination control method of claim 11, wherein the calculating of the luminance value of the lighting apparatus on the basis of the target illuminance received from the user and the illuminance contribution of each of the lighting apparatuses and the controlling of the luminance of the lighting apparatus includes:
setting all of the luminance of the lighting apparatus and the at least other lighting apparatus to maximum values;
calculating a first luminance value in which the luminance of each of the lighting apparatuses is decreased for the luminance of the lighting apparatus and the at least other lighting apparatus on the basis of the target illuminance, the luminance of the lighting apparatus, the luminance of the at least other lighting apparatus, and the illuminance contribution of each of the lighting apparatuses;
calculating a second luminance value in which the luminance of each of the lighting apparatuses is increased for the luminance of the lighting apparatus and the at least other lighting apparatus on the basis of the target illuminance, the luminance of the lighting apparatus, the luminance of the at least other lighting apparatus, and the illuminance contribution of each of the lighting apparatuses; and
calculating a third luminance value in which the luminance of each of the lighting apparatuses is increased for the luminance of at least one lighting apparatus of the lighting apparatus and the at least other lighting apparatus on the basis of the target illuminance, the luminance of the lighting apparatus, the luminance of the at least other lighting apparatus, and the illuminance contribution of each of the lighting apparatuses.

15. An automatic illumination control apparatus comprising:

a processor, and a memory configured to store units comprising commands executed by the processor, wherein the units comprise:

an illuminance calculator which calculates illuminances of a plurality of lighting apparatuses on at least one flat target surface on the basis of information regarding the lighting apparatuses stored in a database and flat target surface information received from a user;

a contribution calculator which calculates an illuminance contribution of each of the lighting apparatuses on the at least one flat target surface on the basis of the illuminances of the lighting apparatuses on the at least one flat target surface; and a luminance calculator which calculates a luminance value of each of the lighting apparatuses on the basis of a target illuminance received from the user and the illuminance contribution of each of the lighting apparatuses to control a luminance of each of the lighting apparatuses for luminance of the lighting apparatuses.

16. The illumination control apparatus of claim 15, wherein the illuminance calculator:

calculates angles of the lighting apparatuses toward the at least one flat target surface with respect to a vertical line to the at least one flat target surface on the basis of the information regarding the lighting apparatuses and the flat target surface information;

calculates a luminous intensity of each of the lighting apparatuses on the basis of the information regarding the lighting apparatuses and the angles with respect to the vertical line; and calculates the illuminance of each of the lighting apparatuses on the basis of the flat target surface information and the luminous intensity.

17. The illumination control apparatus of claim 15, wherein the luminance calculator:

sets all of the luminance of the lighting apparatuses to maximum values;

calculates a first luminance value in which the luminance of each of the lighting apparatuses is decreased for the luminance of the lighting apparatuses on the basis of the target illuminance, the luminance of the lighting apparatuses, and the illuminance contribution of each of the lighting apparatuses;

calculates a second luminance value in which the luminance of each of the lighting apparatuses is increased for the luminance of the lighting apparatuses on the basis of the target illuminance, the luminance of the lighting apparatuses, and the illuminance contribution of each of the lighting apparatuses; and calculates a third luminance value in which the luminance of at least one of the lighting apparatuses is increased for the each of the lighting apparatuses on the basis of the target illuminance, the luminance of the lighting apparatuses, and the illuminance contribution of each of the lighting apparatuses.

* * * * *